United States Patent [19]

Nomura et al.

[11] Patent Number: 5,327,526
[45] Date of Patent: Jul. 5, 1994

[54] PRINT JOB CONTROL SYSTEM

[75] Inventors: Hideki Nomura; Yuzo Fujita, both of Kanagawa, Japan

[73] Assignee: Fuji Xerox Co., Ltd., Tokyo, Japan

[21] Appl. No.: 156,971

[22] Filed: Nov. 24, 1993

Related U.S. Application Data

[63] Continuation of Ser. No. 10,459, Jan. 27, 1993, abandoned, which is a continuation of Ser. No. 595,809, Oct. 10, 1990, abandoned.

[51] Int. Cl.$^5$ ............................................. G06F 15/00
[52] U.S. Cl. ...................................... 395/115; 395/114
[58] Field of Search ............... 395/101, 111, 114, 115, 395/116, 112, 650, 200; 358/403, 444; 400/70, 71, 62

[56] References Cited

U.S. PATENT DOCUMENTS

| | | | |
|---|---|---|---|
| 4,829,468 | 5/1989 | Nonaka et al. | 395/101 |
| 4,947,345 | 8/1990 | Paradise et al. | 395/114 |
| 5,081,595 | 1/1992 | Moreno et al. | 395/111 |
| 5,164,842 | 11/1992 | Gauronski et al. | 358/444 |

OTHER PUBLICATIONS

Kamiya, "Local Area Networks", Maruzen, pp. 229-256. No translation!

*Primary Examiner*—Arthur G. Evans
*Attorney, Agent, or Firm*—Finnegan, Henderson, Farabow, Garrett & Dunner

[57] ABSTRACT

A print job control system which processes print requests to set an order of priority for printing print jobs. A print job manager checks the print request and determines what print option is selected and manipulates the queue identifiers associated with respective print jobs and enters them into a print queue table. One feature allows changing the print order thereby overriding the designated print option. Another feature allows for increasing the priority of low priority jobs regardless of the designated print option assuring that the low priority jobs will be printed.

6 Claims, 7 Drawing Sheets

FIG. 7A

| | | |
|---|---|---|
| | | +30 → |
| qn | 10 | |
| qn-1 | 20 | |
| qn-2 | 30 | |
| qn-3 | 40 | |
| | | ─── TH |
| qm | 100 | |
| qℓ | 200 | |
| q3 | 600 | |
| q2 | 800 | |
| q1 | 1000 | |

FIG. 7B

| | | |
|---|---|---|
| | | +30 → |
| qn | 40 | |
| qn-1 | 50 | |
| qn-2 | 60 | |
| qn-3 | 70 | |
| | | ─── TH |
| qx | 100 | |
| qm | 130 | |
| qℓ | 230 | |
| q3 | 630 | |
| q2 | 830 | |

FIG. 7C

| | | |
|---|---|---|
| | | +30 → |
| | | |
| qn | 70 | |
| qn-1 | 80 | |
| qn-2 | 90 | |
| qn-3 | 100 | ─── TH |
| qx | 130 | |
| qm | 160 | |
| qℓ | 260 | |
| q3 | 660 | |

FIG. 7D

| | | |
|---|---|---|
| | | +30 → |
| | | |
| | | |
| | | |
| | | |
| | | ─── TH |
| qn | 100 | |
| qn-1 | 110 | |
| qn-2 | 120 | |
| qn-3 | 130 | |
| qx | 160 | |
| qm | 190 | |
| qℓ | 290 | |

FIG. 7E

| | | |
|---|---|---|
| | | +30 → |
| | | |
| | | |
| | | |
| | | |
| | | ─── TH |
| qy | 110 | |
| qn | 130 | |
| qn-1 | 140 | |
| qn-2 | 150 | |
| qn-3 | 160 | |
| qx | 190 | |
| qm | 220 | |

FIG. 7F

| | | |
|---|---|---|
| | | +30 → |
| | | |
| | | |
| | | |
| | | |
| | | ─── TH |
| qy | 140 | |
| qz | 150 | |
| qn | 160 | |
| qn-1 | 170 | |
| qn-2 | 180 | |
| qn-3 | 190 | |
| qx | 220 | |

PRINT JOB CONTROL SYSTEM

This application is a continuation of application Ser. No. 07/010,459 filed Jan. 27, 1993, which was a continuation application of application Ser. No. 07/595,809, filed Oct. 10, 1990, both now abandoned.

BACKGROUND OF THE INVENTION

1. Field of the Invention

This invention relates to a print job control system that is linked to a local area network (LAN) or other communications information networks for efficient processing of print requests generated from a plurality of workstations.

2. Discussion of the Related Art

LANs and other communications information networks (hereinafter referred to simply as "networks") generally have a plurality of workstations, file servers, terminals, facsimile machines and various servers linked thereto, as well as a print server which controls the print job using a processor in the execution of various print jobs (the print server is hereinafter referred to as a "printer").

The essential part of a network of the type contemplated by the present invention is shown schematically in FIG. 9, in which the network generally indicated by 10 has linked thereto various servers including a plurality of workstations 11 (11-1, 11-2, ... 11-n), a printer 12, a facsimile 13 and a file server 14.

While many workstations generating print jobs are usually linked to the network, a smaller number of printers 12 are used and, in a typical case, a single printer is used with several workstations. In order to execute print jobs generated from a plurality of workstations 11 in a predetermined order, the print job control processor builds a print queue table containing all queue identifiers necessary to identify the print jobs to be executed, and the specific printing of jobs is performed in accordance with the print queue table.

Prior print job control systems have the capability of automatically changing the order of queue identifiers in the print queue table in accordance with the specific sort option designated by the operator. When this system receives a new print job, the queue identifier of the print job is inserted into the print queue at an appropriate position in accordance with the sort option designated by the operator. The system is so designed that in the absence of a designated sort option, the operator is free to rearrange certain queue identifiers in the print queue table. If a particular sort option is designated by the operator, the system will disregard the position of the queue identifier for the operator-designated print job in the print queue table and rearrange queue identifiers in the order that complies with the particular designated sort option.

In typical prior art systems the following four sort options (1)-(4) may be designated by the operator:

(1) print requests are sorted according to the time they are entered (First-in First-out, or FIFO);

(2) the queue identifier for the print job that requires binding is inserted at the top of the print queue table (Binder First);

(3) print requests are sorted according to the requested time of printing (Short Job First); and (4) the media (printing media) required in a particular print job are compared with the media loaded in the printer and the queue identifier of a print Job which is such that all the media it requires are loaded (e.g., a print job that uses a plurality of media to print graphs on OHP sheets and sentences on sheets of plain paper to create a report containing the graphs) and is inserted at the top of the print queue table (Stack Match).

While the prior art of the kind outlined above is described in many books, "Local Area Networks" ed. by Akihiro Kamiya and published by Maruzen, pp. 229-256 is cited as a typical reference.

In the prior art outlined above, the operator can change the order of queue identifiers on the print queue table only when he has not designated a sort option. If he wants to execute an urgent print job, he must first cancel the currently operating sort option before changing the order of queue identifiers on the print queue table (by inserting the queue identifier of the urgent print job at the head of the print queue table). These procedures are unsuitable for rapidly processing documents that must be urgently printed out.

A further problem with the prior art occurs with the four sort options described above, since a print job that is located toward the end of the print queue table will never be executed as long as a higher-priority print request is accepted.

SUMMARY OF THE INVENTION

The present invention has been made in view of the above circumstances and has as an object to provide a print job control system which, in the presence of an already designated sort option, allows the operator to achieve preferential execution of an urgent print job by changing the order of queue identifiers on the print queue table through simple procedures.

A further object of the present invention is to provide a print job control system which, in addition to the capability described above, has means for enabling a lower-priority print job to be accomplished at an appropriate time, thereby circumventing a possibly unlimited delay in the execution of that print job because it would otherwise be located toward the end of the print queue table and never reached.

To achieve the objects and in accordance with the purpose of the invention, as embodied and broadly described herein, the print job control system of this invention comprises means for accepting a print request from the workstation on the network, means for designating one of a plurality of sort options to set the priority for printing print jobs, means for managing the printing order of print jobs by checking the print request against the sort option and establishing a queue identifier in accordance with the sort option, a print queue table for receiving queue identifiers from the managing means at selected queue positions in the table which correspond to the order of execution of the print jobs, means for changing the printing order of print jobs and thereby overriding the sort option by rewriting the queue identifier for a print job in the print queue table, and means for processing the print jobs in accordance with the order of queue identifiers in the print queue table.

BRIEF DESCRIPTION OF THE DRAWINGS

The accompanying drawings, which are incorporated in and constitute a part of this specification illustrate embodiments of the invention, and together with the description, serve to explain the objects, advantages and principles of the invention. In the drawings.

FIGS. 7A-7F show how the print job table is manipulated by calculation of priority values;

DETAILED DESCRIPTION OF THE INVENTION

The present invention as here embodied is a print job control system that is linked to a network 10 and which enables the print jobs transferred from workstations 11-1 to 11-n to be processed for printing in the order determined in accordance with a preliminarily designated sort option. The control system of the present invention has a print queue table 6 having queue identifiers that designate the order of execution of the print jobs; and a print job manager 5 that manages the positional layout of the queue identifiers on the print queue table 6.

Figure 1:
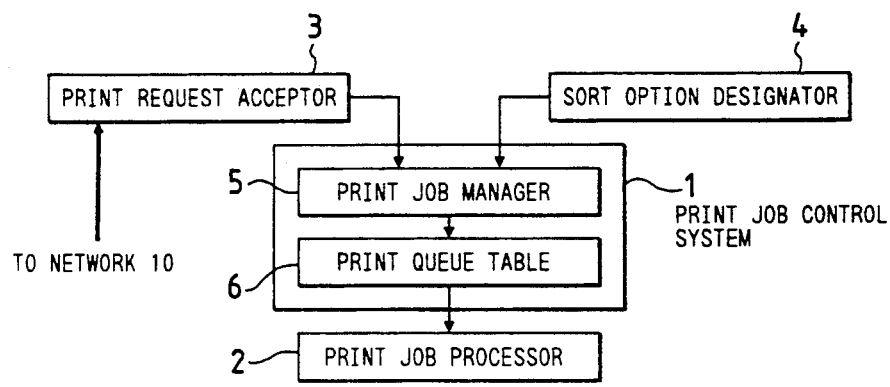
FIG. 1 is a block diagram showing the basic concept of the present invention.

FIG. 1 is a block diagram showing the basic concept of the present invention, which comprises a print job control system 1, a print job processor 2, a print request acceptor 3, and a sort option designator 4. The print job control system 1 is comprised of a print job manager 5, and a print queue table 6 which holds print job identifiers in the form of a queue.

In the print job control system of this invention, the print job manager 5 manages the order of executing print jobs from workstations 11 received through the print request acceptor 3. The jobs are arranged in the order determined by the sort option designator 4 or by the operator's designation or by the manipulation of priority values. The print job control system performs a print-out operation by outputting print jobs to the print job processor 2 according to the order of print queue identifiers thus set on the print queue table 6. These procedures enable efficient execution of the print jobs generated from a plurality of workstations.

Figure 9:
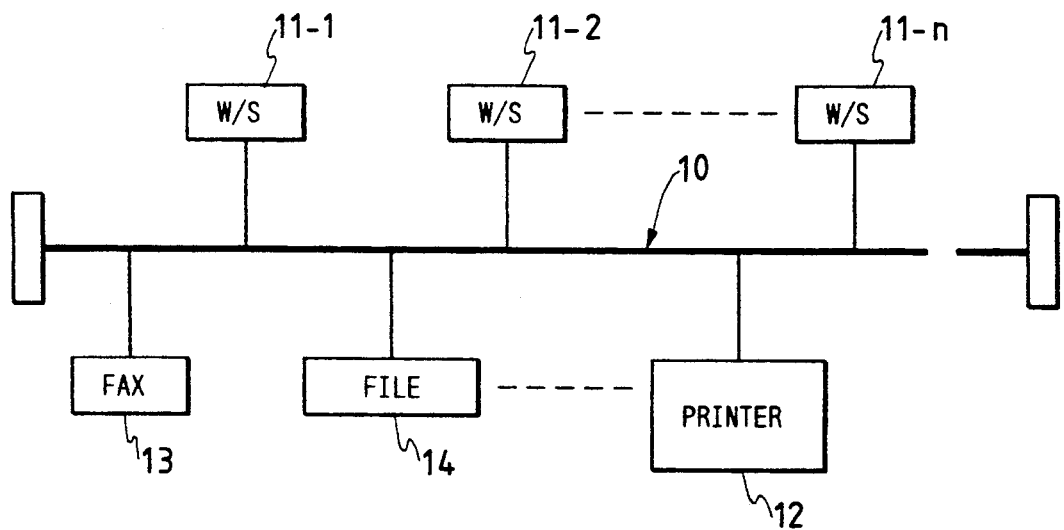
FIG. 9 is a schematic representation of a part of a network in which the present invention can be used.

In operation, data concerning the print job transferred over network 10 (FIG. 9) is entered into printer 12 through the print request acceptor 3.

Figure 2:
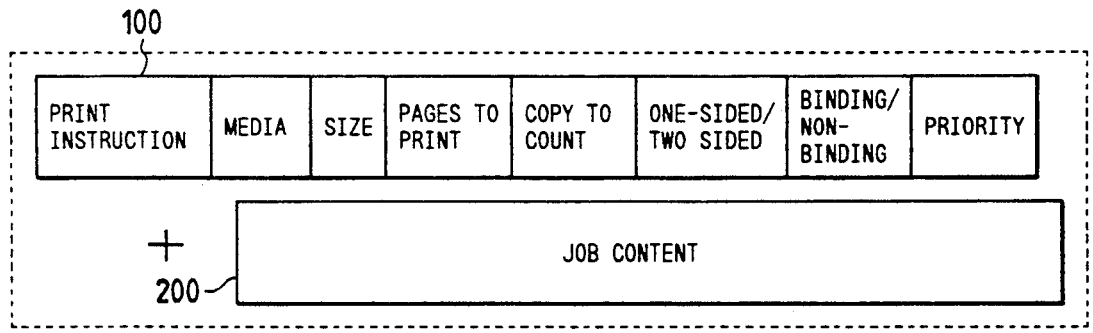
FIG. 2 shows the data of a print job transferred from a workstation.

FIG. 2 shows schematically the form of the digital data which identifies a print job transferred from a workstation. As shown, the print job data is composed of control data portion 100 and the job content portion 200.

The control data portion 100 is in a standard digital format and typically contains a print instruction, media type designating the media to print out, media size, the number of pages to print out, the number of copies to print out, selection between one-sided and two-sided prints, selection between binding and non-binding and a directive for priority (as expressed by the magnitude of priority value), as well as any other control data (not shown) necessary for executing print jobs.

The job content portion 200 is usually the actual document to be printed in digital form. It should be noted here that FIG. 2 is merely intended to describe the concept of data composition and in practice the print job data is described by Interpress, Postscript or other page description languages when it is transferred over the network.

Referring again to FIG. 1, the print job data accepted by the print request acceptor 3 is inputted to the print job manager 5 in the print job control system 1. The print job manager 5 generates a queue identifier of the accepted print job in accordance with the control data 100 and places the queue identifier at a selected position in a column of print queue identifiers that has been generated in the print queue table 6 according to either the sort option designated by the operator from the sort option designator 4 or the order designated by the operator after the sort option was canceled or according to a preset algorithm.

Figure 3:
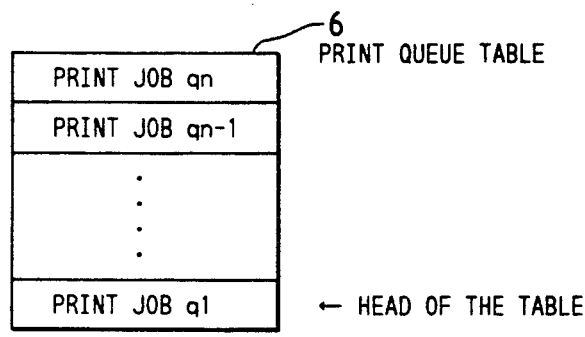
FIG. 3 shows a print queue table.

FIG. 3 shows the print queue table 6. The print queue to be managed by the print job manager consists of the associated identifiers $q_1, q_2, \ldots q_n$ that are arranged in that order in the table, and the print jobs are successively outputted for printout by the print job processor 2, with the print job content having identifier $q_1$ being outputted first. The print job processor 2 executes print jobs according to the queue order in the print queue table 6.

The print job content 200 shown in FIG. 2 is maintained either in a file storage means (not shown) in the printer 12 or in a file storage means (file server) linked to the network 10 and is outputted to the print Job processor at the time when the associated identifier has come to the head of the print queue table 6.

Figure 4:
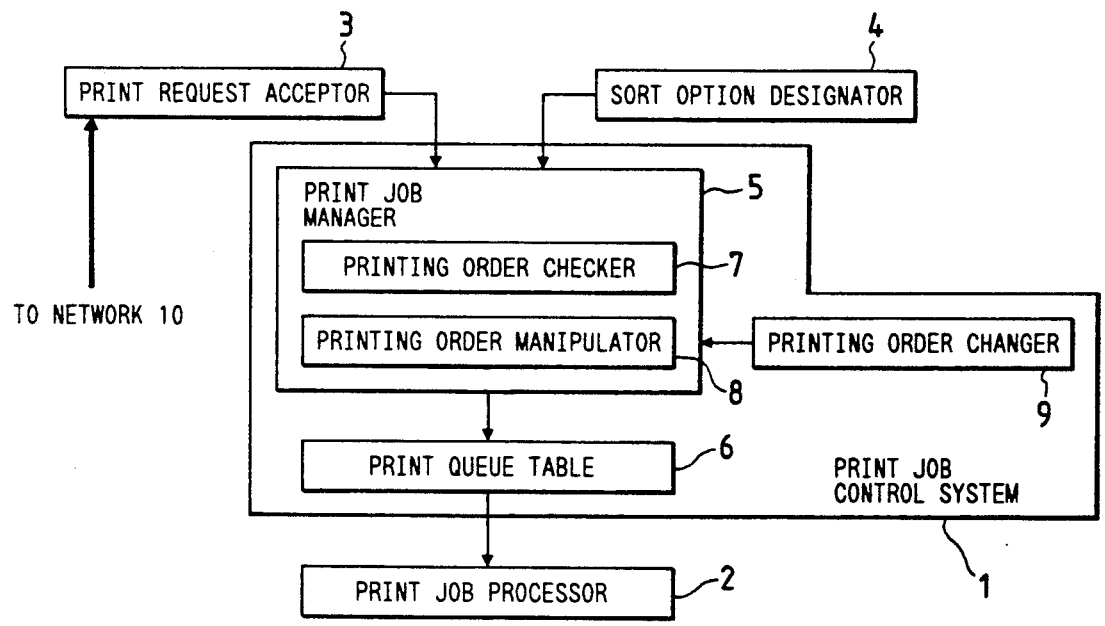
FIG. 4 is a block diagram showing a first embodiment of the present invention.

As embodied in FIG. 4 the print job control system of this invention includes a printing order checker 7, a printing order manipulator 8, and printing order changer 9. The print job data accepted by the print request acceptor 3 is applied to the print job control system 1. One of the sort options (1)-(4) is designated by the sort option designator 4. The printing order checker 7 in the print job manager 5 checks the printing order that complies with the designated sort option, and the printing order manipulator 8 places the queue identifier of the accepted print job at a selected queue position in the print queue table 6.

In the embodiment of the present invention as shown in FIG. 4, the print job control system includes a printing order changer 9 which, when the sort option has been designated, gives a direction for changing the printing order set by the sort option, and the print job manager 5 has a printing order checker 7 which checks the printing order in accordance with the sort option and a printing order manipulator 8 which manipulates the order of queue identifiers on the print queue table in accordance with a direction for changing the printing order supplied from the printing order changer 9.

In the print job control system of this invention as shown in FIG. 4, the printing order checker 7 in the print job manager 5 sets a printing order in response to the designation by the sort option designator 4, and the printing order manipulator 8 changes this printing order in accordance with the directions given by the operator via the printing order changer 9, and the resulting change in order is finalized as a change in the positions of queue identifiers on the print queue table 6. The procedures enable the operator to change the order of processing the print jobs even in the presence of an already designated sort option.

If a priority indicating that the print job is to be executed preferentially has been written into the control data for that print job, this fact is displayed at the operator's console on the printer. Or if the operator himself recognizes that the print job is to be executed preferentially, he will provide the print job manager with a direction for changing the printing order that is supplied from the printing order changer 9 in the print job control system 1.

In accordance with the direction from the printing order changer 9, the printing order manipulator 8 in the print job manager 5 allows the identifier of the accepted print job to be inserted into the print queue table 6 at a queue position for preferential processing, for instance at the head of the queue. Thus, the direction from the printing order changer 9 rewrites the print queue table 6 in preference over the queue layout associated with the sort option selected by the operator and set by the sort option designator 4. The print job processor 2 executes the processing of the accepted print job in accordance with the order of queue identifiers on the rewritten print queue table 6.

Figure 5:
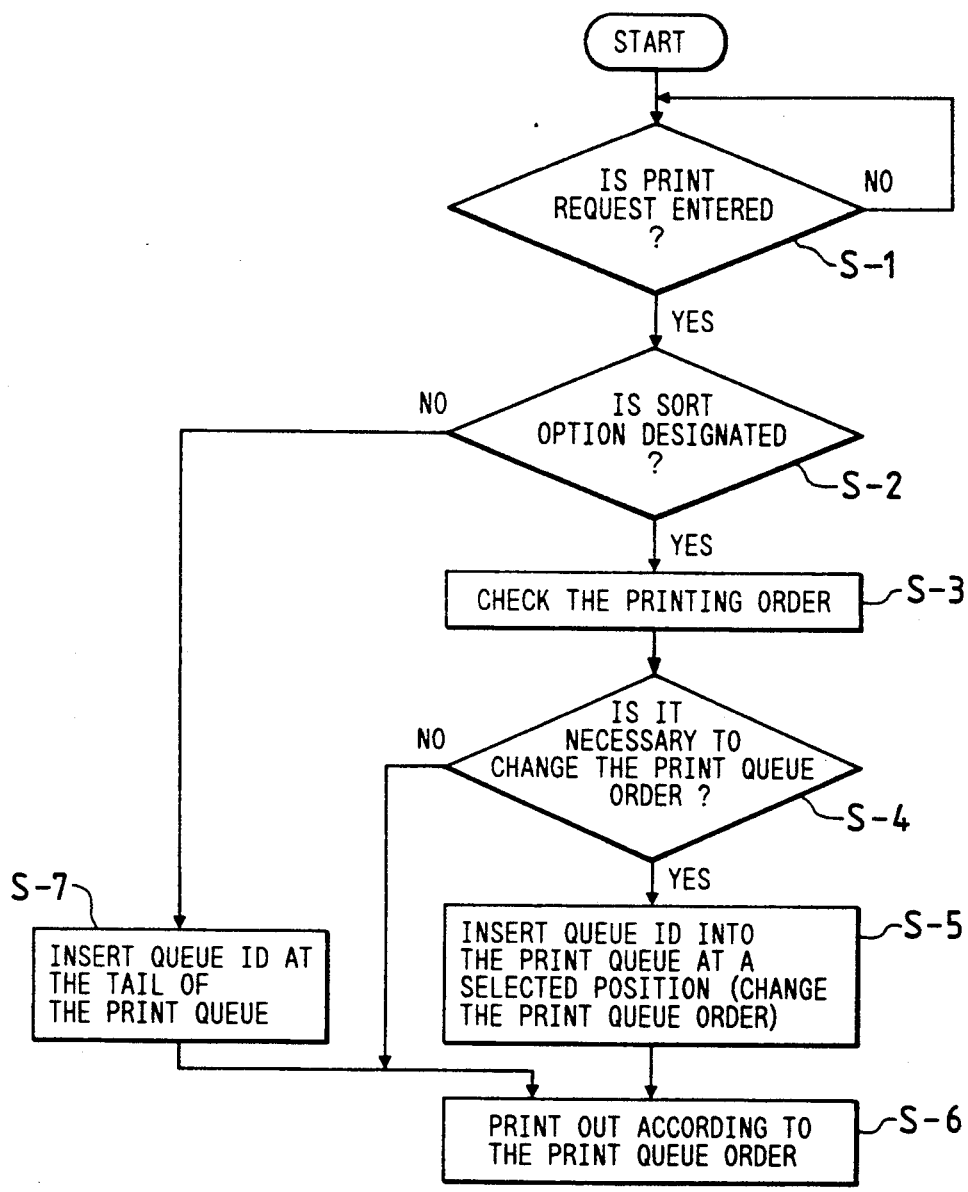
FIG. 5 is a flowchart showing the sequence of steps in the operation of the embodiment of the present invention shown in FIG. 4.

The operation of the embodiment of FIG. 4 of the present invention is described below in greater detail with reference to the flowchart shown in FIG. 5. In the description that follows, a print job is sometimes referred to simply as "a print".

When the printer starts to run, the print job control system checks for the acceptance of a print job to be processed (step 1 which hereafter is abbreviated as S-1). If the print request is honored, the system checks to see if a sort option has been designated (S-2). If the answer is negative, the identifier of the honored print job is inserted at the end of the queue in the print queue table. If a certain sort option has been designated, the system checks the printing order according to the designated sort option (S-3).

In the next step (S-4), the system checks for the need to change the print queue order (i.e., whether a direction for changing the printing order has been given). If the answer is negative, the print queue is maintained in its current state. Otherwise, the printing order is manipulated and the identifier of the honored print job is inserted into the print queue table at a selected position (e.g., the head of the table), thereby changing the print queue order (S-5).

The system then executes the honored print job in accordance with the queue order in the print queue table (S-6).

These steps enable a higher-priority print job to be executed promptly for printout despite the presence of an already designated sort option.

If the current sort option is changed after the operator changes the order of queue identifiers on the print queue table, the queue identifiers will be rearranged in the order that is associated with the new sort option.

If the current sort option is cancelled and no new sort option is designated after the operator changes the order of queue identifiers on the print queue table, the order of queue identifiers designated by the operator, namely, the contents of the print queue table 6 arranged by the operator's manipulation, will be retained intact.

Figure 6:
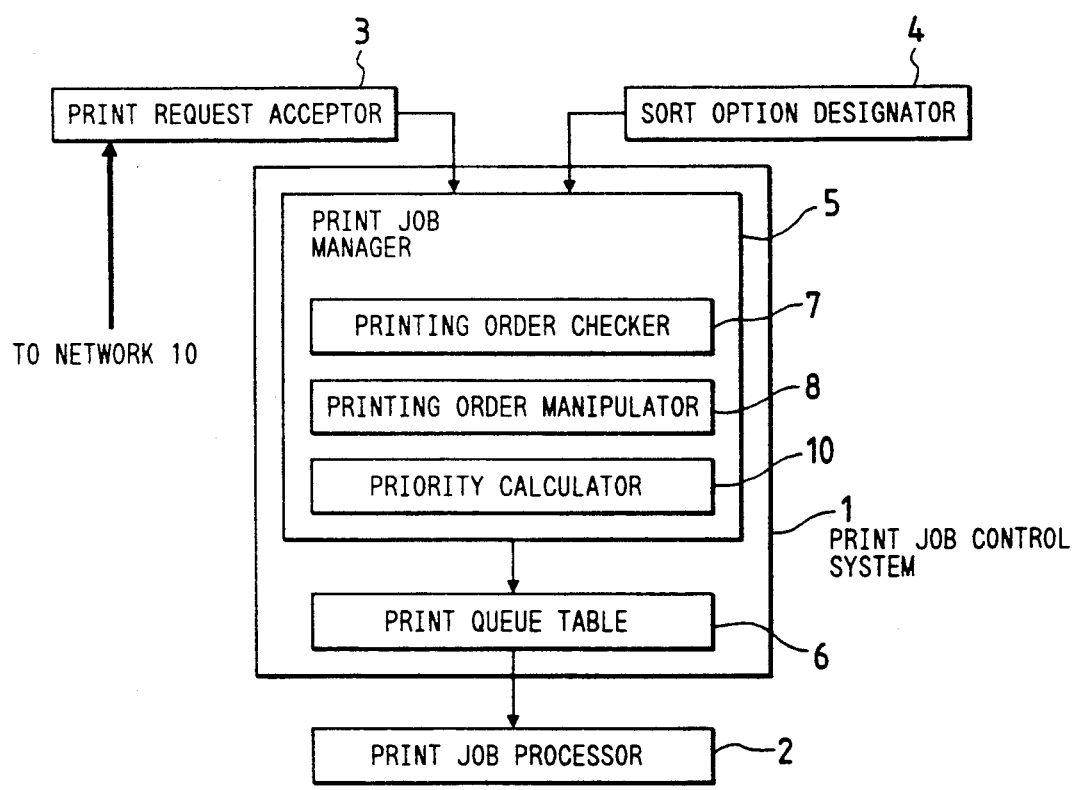
FIG. 6 is a block diagram showing a second embodiment of the present invention.

In another embodiment, as shown in FIG. 6, the print job manager 5 has a printing order checker 7 which checks the printing order in accordance with the sort option, a priority calculator 10 which adds a predetermined value to the priority value of each of the queue identifiers on the print queue table 6, and a printing order manipulator 8 which manipulates the order of queue identifiers on the print queue table.

In the print job control system of this invention and as embodied in FIG. 6, the printing order checker 7 in the print job manager 5 sets a printing order in response both to the priority data (priority value) written into the print job control data and to the designation by the sort option designator 4, and the printing order manipulator 8 sets the order of queue identifiers on the print queue table 6 in accordance with this printing order.

However, the priority calculator 10 adds, at given time intervals, a predetermined value to the priority value of each of the queue identifiers set in the print queue table 6 and changes the positions of those queue identifiers on the print queue table 6 on the basis of the increased priority values.

These procedures prevent an unlimited delay in the processing of a print job of a lower priority (i.e., a lesser priority value) and allows it to be executed within an appropriate time.

The print job data transferred from a workstation over network 10 is honored by the print request acceptor 3 and is inputted to the print job control system 1. In accordance with the order designated by the sort option designator 4 and/or the priority value written into the print job control data, the printing order checker 7 in the print job control system 1 checks the printing order and, on the basis of the result of checking or in accordance with the printing order determined by the operator's manipulation in the manner already described with the first embodiment, the printing order manipulator 8 sets a new order of queue identifiers in the print queue table 6.

A lower-priority print job in the print queue table 6 will never be executed for printout as long as a print job having a higher priority value is honored. To avoid this problem, the priority calculator 10 is included in the print job manager 5 according to this embodiment of the invention and the print queue table 6 is manipulated by performing the calculation of priority values in the manner described below.

FIGS. 7A-7F show how the print job table is manipulated over some time period by calculation of priority values. Suppose the print queue table 6 has the initial state shown in FIG. 7(A). As already mentioned, the print job control data supplied from the print request acceptor 3 contains a certain value of priority. If the priority threshold for preferential printing operation is 100 (as indicated by the level of line TH in FIG. 7(A)), queue identifiers having priority values of 100 and over will be located closer to the top of the queue table (the higher the priority value of a queue identifier, the closer it is to the head of the queue table).

The print jobs having queue identifiers qn, . . . and qn-3 with priority values smaller than 100 (see FIG. 7(A)) are unable to exceed the level of TH line as long as a queue identifier qx having a priority value of 100 or more (see FIG. 7(B)) is honored and those print jobs will not be performed until all the print jobs having queue identifiers qm, ql, . . . with priority values of 100 (line TH) and over which qualify for preferential processing have been executed for printout.

Under these circumstances, the priority calculator 10 adds a certain value, say, "+30" (as indicated at the top of each FIG. 7A-7F) to the priority value of each queue identifier at a predetermined time interval of T. FIGS.

7(A)-7(F) show how the priority values of respective queue identifiers and, hence, their positions on the queue table will change over subsequent time intervals T. When time 2T lapses through the sequence shown in FIGS. 7(A), 7(B) and 7(C), the priority value of queue identifier qn-3 increases to 100 and qualifies for preferential processing since it exceeds the level of line TH. Similarly, when time 3T lapses, all the queue identifiers qn, ... qn-3 that previously had priority value less than 100 become eligible for preferential processing (see FIG. 7 (D)).

These procedures of adding a predetermined amount of priority value at predetermined time intervals offer the advantage that even a print job having an initial low priority will eventually have an increased priority value assigned to the associated queue identifier that exceeds the level of line TH. Even if queue identifiers qy and qz having higher priority values of 110 and 150, respectively, are honored at a later time, the priority value of the first mentioned queue identifier will never drop below the level of line TH and will instead continue to advance toward the head of the queue table.

It is shown in FIG. 7(E) that the print job having a queue identifier qy with a priority value of 110 has been honored and, in FIG. 7(F), it is shown that the print job having a queue identifier qz with a priority value of 150 has been honored. Since these queue identifiers, which are newly added-to the table, have lower priority values than queue identifiers qn, qn-1, ... which initially had low priority values, the print job having the queue identifier qn will be first executed for printout.

Needless to say, if, at this point of time, a print job having a queue identifier assigned a higher priority value than qn, qn-1, ... is honored, that higher-priority queue identifier will be inserted into the queue table at a location closer to the head than qn, qn-1, . . . .

Figure 8:
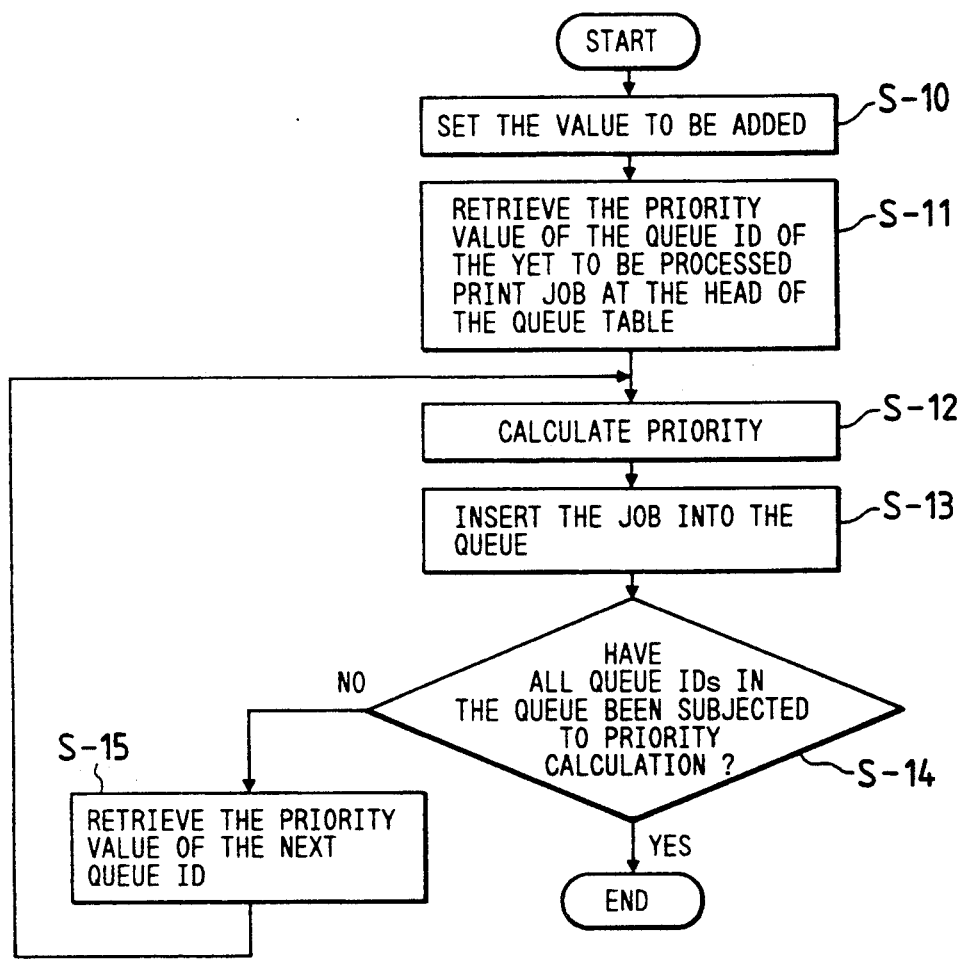
FIG. 8 is a flowchart showing the sequence of steps in the process of calculating priority values.

FIG. 8 is a flowchart showing the sequence of steps in the process of calculating priority values in the embodiment of FIG. 6. In the first step, the priority calculator 10 sets the value to be added to the priority value of each of the queue identifiers of print jobs in the queue table (S-10). When the predetermined time interval T lapses, the priority calculator 10 retrieves the priority value assigned to the queue identifier of one of the yet to be processed print jobs in the queue table (S-11). The retrieved priority value is subjected to an add operation for adding the "value to be added" which has been set in S-10 (S-12). The result of this addition is assigned as a new priority value for the previously retrieved queue identifier and the printing order manipulator 8 inserts this queue identifier having the new priority value into the print queue table 6 at a higher position in the queue (S-13).

These procedures are successively repeated for the other print jobs to be processed in the queue table. The priority value assigned to the queue identifier of each of these print jobs is retrieved and subjected to an add operation in the same manner as described above. The queue identifiers thus assigned to the new priority values are inserted into the queue table in the descending order of priority values.

If the queue table no longer contains a queue identifier to be subjected to the calculation of priority value (S-14), the above-described process of priority calculation ends.

These procedures are taken at every interval of time T and the queue table is manipulated in the manner already described with reference to FIG. 7. As a result, even a print job that initially had a low priority when the print request was honored is sure to be executed for printout after the lapse of an appropriate time.

If the current sort option is changed between two time intervals T, the necessary calculation of priority values will be performed in accordance with the new sort option and the print queue table is reconstructed accordingly.

The value to be added to the priority value of an individual queue identifier may be changed or set as appropriate depending upon the status of the system under operation.

The priority values and the value to be added that are mentioned above are merely intended as being exemplary and it should also be noted that the level of line TH as a priority threshold for making a certain print job eligible for preferential processing and the associated calculation period T can be set to any desired values.

As described on the foregoing pages, the print job control system of the present invention is suitable for use with a printer having a sort option capability and even in the case where a certain sort option is already set, the operator is free to modify the order of arrangement of queue identifiers on the print queue table so that he can meet the requirement for urgent printout. Further, the system has the added advantage that even a print job having a low priority value when its request is honored can be executed for printout within an appropriate time by increasing its priority value at appropriate time intervals, and this successfully solves another ma jot problem of the prior art, i.e., an unlimited delay in executing print jobs having low priority values.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A print job control system for controlling the order of executing a plurality of print jobs transmitted on a computer network having a plurality of workstations for transmitting the plurality of print jobs and corresponding print request, a print job processor for executing the print jobs, and means for designating any one of a plurality of sort options, said print job control system comprising:

means, responsive to the designated sort option, for managing the order of executing print jobs, the managing means including, means for establishing a queue identifier having a priority value corresponding to the priority for executing the any one of the plurality of print jobs in accordance with the designated one of a plurality of sort options, a print queue table for receiving the plurality of established queue identifiers at queue positions in said print queue table corresponding to the order of the print jobs in accordance with the priority value;

means for changing the order of executing print jobs including, means for establishing the priority value of any one of the plurality of queue identifiers independent of the designated sort option.

means for periodically changing the priority value of any one of the plurality of queue identifiers in the print queue table by adding a predetermined value to reflect a high priority in accordance with the duration held in the print queue table; and means for executing the print jobs in accordance with the order of queue identifiers in said print queue table.

2. The print job control system of claim 1, further comprising:

means for selecting the predetermined value used by the means for periodically changing the priority value.

3. A print job control system for controlling the order of printing a plurality of print jobs transmitted on a computer network having a plurality of workstations for transmitting the plurality of print jobs and corresponding print requests, a print job processor for printing the plurality of jobs and means for designating any one of a plurality of sort options, said print job control system comprising:

means, responsive to the designated sort option, for managing the order of printing print jobs including, means for establishing a queue identifier for the any one of the plurality of print request, the queue identifier having a priority value corresponding to the priority for printing the any one of the plurality of print jobs in accordance with the designated one of a plurality of sort options;

a print queue table for receiving the plurality of established queue identifiers at queue positions in said print queue table in accordance with the priority value;

means for selecting a predetermined value and for adding the predetermined value to the priority value of each of the queue identifiers held in said print queue table to reflect a higher priority in accordance with the duration held in the print queue table; and means for printing the print jobs in accordance with the order of queue identifiers in said print queue table.

4. A method of processing a plurality of print jobs, comprising the steps of:

receiving a print job request corresponding to any one of the plurality of print jobs;

determining which one of a plurality of sort options has been designated;

checking the order of the print jobs held in a print queue table in accordance with the print job request and the designated sort option;

generating a queue identifier having a priority value corresponding to the priority for executing the any one of the plurality of print jobs;

adding a predetermined value to the priority value of each queue identifier held in the print queue table to reflect a higher priority in accordance with the duration held in the print queue table; and entering said queue identifiers, after the step of adding the predetermined value, in the print queue table.

5. The method of claim 4 wherein the step of adding a predetermined value is repeated periodically.

6. The print job control system of claim 3, wherein the adding of the predetermined value to the priority value of each of the queue identifiers in said queue table is repeated periodically by said selecting means.

* * * * *

UNITED STATES PATENT AND TRADEMARK OFFICE
CERTIFICATE OF CORRECTION

PATENT NO. : 5,327,526
DATED : July 05, 1994
INVENTOR(S) : Hideki NOMURA et al

It is certified that error appears in the above-indentified patent and that said Letters Patent is hereby corrected as shown below:

Claim 1, Column 8, Line 53 change "request" to --requests--.

Claim 1, Column 9, Line 5 change "option." to --option,--.

Claim 3, Column 9, Line 31 change "request" to --requests--.

On the title page, Column 2, second line below "OTHER PUBLICATIONS", delete "No translation!"

Signed and Sealed this

Twenty-first Day of March, 1995

BRUCE LEHMAN

Attest:

Attesting Officer

Commissioner of Patents and Trademarks